(12) United States Patent
Nagasawa

(10) Patent No.: US 10,974,755 B2
(45) Date of Patent: Apr. 13, 2021

(54) STEERING WHEEL

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 41 days.

(21) Appl. No.: 16/246,602

(22) Filed: Jan. 14, 2019

(65) Prior Publication Data

US 2019/0276065 A1    Sep. 12, 2019

(30) Foreign Application Priority Data

Mar. 12, 2018 (JP) .............................. JP2018-043762

(51) Int. Cl.
*B62D 1/06* (2006.01)
*B62D 1/10* (2006.01)
*B62D 1/04* (2006.01)

(52) U.S. Cl.
CPC ............... *B62D 1/06* (2013.01); *B62D 1/046* (2013.01); *B62D 1/10* (2013.01)

(58) Field of Classification Search
CPC . B62D 1/06; B62D 1/10; B62D 1/046; B62D 1/04; B62D 1/183
See application file for complete search history.

(56) References Cited

U.S. PATENT DOCUMENTS

| | | | | |
|---|---|---|---|---|
| 2,326,131 A | * | 8/1943 | Eschelbacher | ........... B62D 1/04 74/493 |
| 2007/0221007 A1 | * | 9/2007 | Ozaki | .................... B62D 5/006 74/484 R |
| 2014/0277896 A1 | * | 9/2014 | Lathrop | .................... B62D 1/06 701/23 |
| 2016/0325662 A1 | * | 11/2016 | Nash | ....................... B60N 3/005 |
| 2017/0297606 A1 | | 10/2017 | Kim et al. | |
| 2018/0037248 A1 | | 2/2018 | Schwarz et al. | |
| 2018/0154921 A1 | * | 6/2018 | Bonello | .................... B62D 1/06 |
| 2018/0334183 A1 | * | 11/2018 | Beauregard | .............. B62D 1/06 |
| 2019/0185042 A1 | * | 6/2019 | Lee | ......................... B62D 1/184 |

FOREIGN PATENT DOCUMENTS

| | | | | |
|---|---|---|---|---|
| DE | 20 2014 007 664 U1 | * | 12/2014 | ............... B62D 1/06 |
| JP | 61-205865 U | | 12/1986 | |
| JP | 2009-056837 A | | 3/2009 | |

OTHER PUBLICATIONS

Notice of Reasons for Refusal issued in corresponding Japanese Patent Application No. 2018-043762 dated Sep. 3, 2019 (with English translation).

* cited by examiner

*Primary Examiner* — Frank B Vanaman
(74) *Attorney, Agent, or Firm* — Troutman Pepper Hamilton Sanders LLP

(57) ABSTRACT

A steering wheel includes a handle, a first movement unit, and a second movement unit. The handle is held by an occupant and configured to steer a vehicle by the occupant, and is divided into at least a first division and a second division. The first movement unit is configured to allow the first division to move. The second movement unit configured to allow the second division to move. After the first division is separated from the second division, the second movement unit moves the second division forward, and the first movement unit moves the first division to a region in which the second division was initially disposed.

8 Claims, 4 Drawing Sheets

STEERING WHEEL

The present application claims priority from Japanese Patent Application No. 2018-043762 filed on Mar. 12, 2018, the entire contents of which are hereby incorporated by reference.

BACKGROUND

1. Technical Field

The present invention relates to a steering wheel.

2. Related Art

There has been known a vehicle steering device where the radial length from the rotating center to an operation unit is set long to facilitate rotating operation of a steering wheel by an occupant during failure of a steering assist mechanism, which is disclosed, for example, in Japanese Unexamined Patent Application Publication No. 2009-056837.

SUMMARY OF THE INVENTION

An aspect of the present invention provides a steering wheel including: a handle, a first movement unit, and a second movement unit. The handle is configured to be held by an occupant and operated by the occupant to steer a vehicle by the occupant. The handle is divided into at least a first division and a second division. The first movement unit is configured to allow the first division to move. The second movement unit is configured to allow the second division to move forward. After the first division is separated from the second division, the second movement unit moves the second division forward, and the first movement unit moves the first division to a region in which the second division was initially disposed.

DETAILED DESCRIPTION

Figure 1:
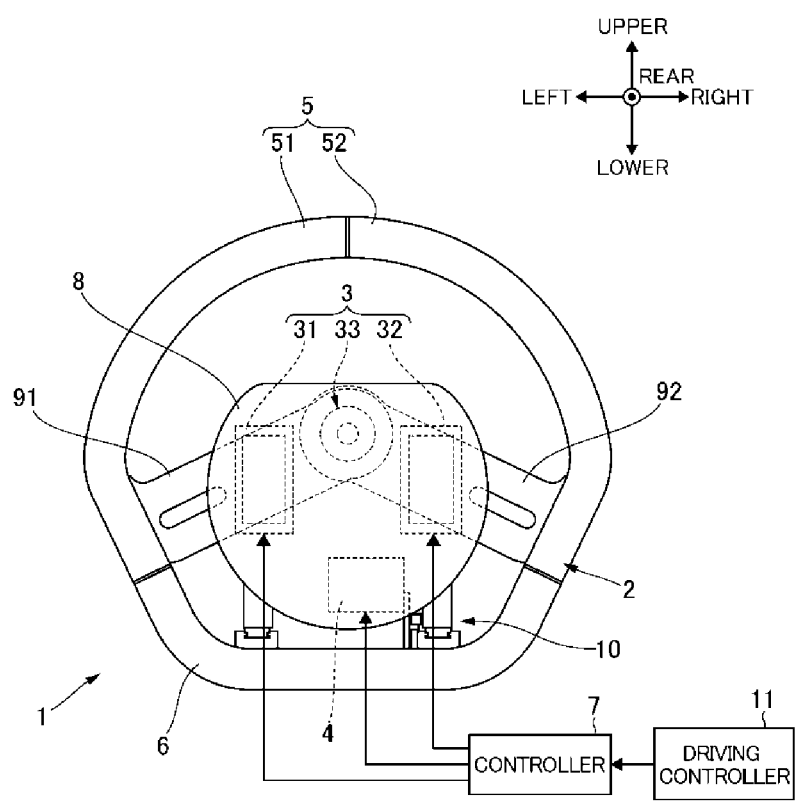
FIG. 1 is a front view illustrating a steering wheel according to an example of the present invention.

Hereinafter, a steering wheel according to an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In a conventional vehicle, its velocity and so forth are indicated on a display panel disposed in front of a steering wheel. In the future, this display panel may indicate a variety of information in an automated driving vehicle, which is different from when a vehicle is manually driven. Here, a conventional steering wheel or the above-described steering wheel may narrow the visible area of the display panel, and therefore the amount of information to be indicated during the automated driving may be limited. However, if a wider display panel is adopted to increase the amount of information to be indicated, it may hinder the direct vision of the driver during the manual driving.

Figure 2A:
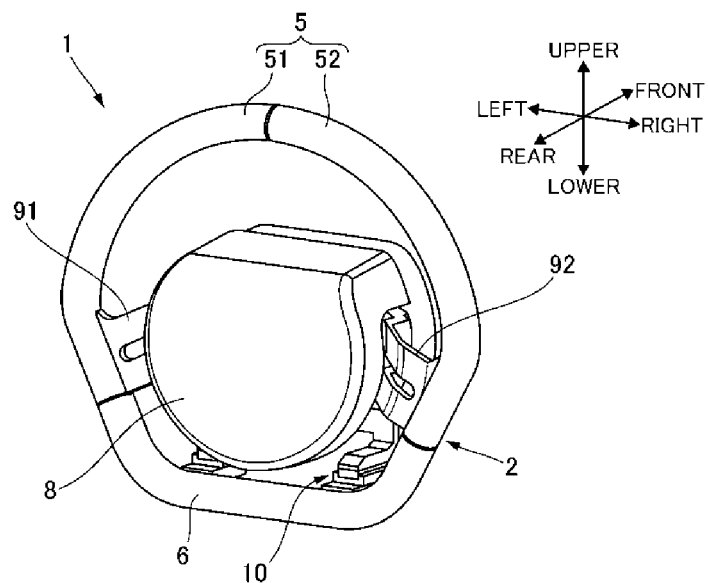
FIG. 2A is a perspective view illustrating the steering wheel illustrated in FIG. 1.
Figure 2B:
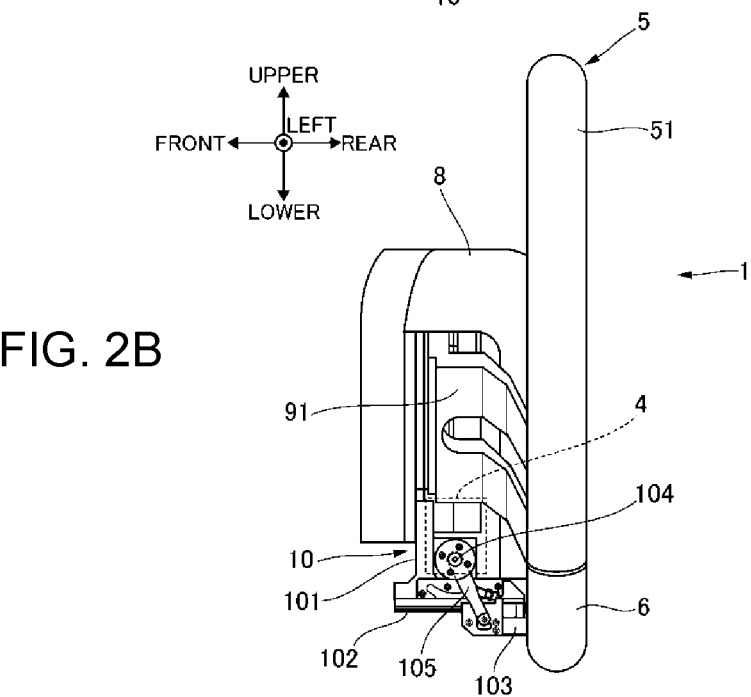
FIG. 2B is a side view illustrating the steering wheel illustrated in FIG. 1.

It is desirable to provide a steering wheel capable of securing the field of view of the driver to view the display panel during the automated driving, while securing the field of view with direct vision of the driver during the manual driving. FIG. 1 is a front view illustrating a steering wheel 1 according to an example of the present invention. FIG. 2A is a perspective view illustrating the steering wheel 1 illustrated in FIG. 1, and FIG. 2B is a side view illustrating the steering wheel 1 illustrated in FIG. 1.

FIG. 1 illustrates the steering wheel 1 viewed from a driver. The steering wheel 1 includes a handle 2, a first movement unit 3, and a second movement unit 4. The handle 2 can be divided into a first division 5 and a second division 6. The first movement unit 3 allows the first division 5 to move, and the second movement unit 4 allows the second division 6 to move. In addition, the steering wheel 1 includes a controller 7 configured to control the drive of the first movement unit 3 and the second movement unit 4.

The handle 2 is held by an occupant and configured to steer the vehicle by the occupant. In the case of conventional vehicles, for example, in the case of a conventional passenger car, the axis of the rotation of the handle 2 is approximately parallel to the front-to-back direction of the car, and meanwhile, in the case of a large-sized vehicle such as a bus and a track, and a special vehicle, the axis of the rotation of the handle 2 is defined along a direction closer to the vertical direction than the front-to-back direction of the vehicle. Here, with the present example, the illustrated handle 2 is adopted to a passenger car. However, when the present invention is applied to a large-sized vehicle and a special vehicle, "upper" and "lower" of the handle 2 correspond to "front" and "rear", and "front" and "rear" of the handle 2 correspond to "upper" and "lower".

The first division 5 can be divided into one side and the other side in the width direction of the vehicle. To be more specific, the first division 5 includes a first left division 51 and a first right division 52. When the handle is not divided and the vehicle goes straight ahead, the first left division 51 is located on the left side of the handle 2, and the first right division 52 is located on the right side of the handle 2. Before the handle 2 is divided, the first left division 51 and the first right division 52 are coupled to one another in an upper part of the handle 2 at an approximate center of the handle 2 in the width direction. Each of the first left division 51 and the first right division 52 is an arc-shaped cylindrical member, and constitutes the upper portion of the handle 2.

When the handle 2 is not divided and the vehicle goes straight ahead, the first division 5 is disposed above the second division 6. The second division 6 is a cylindrical member forming the lower portion of the handle 2. The right and left ends of the second division 6 bend upward and coupled to the first left division 51 and the first right division 52, respectively.

The first movement unit 3 includes a first left movement section 31, a first right movement section 32, and a turning shaft 33. The first movement unit 3 is not limited as long as it can generate a driving force that allows the first division 5 to move. For example, any actuator may be used as the first movement unit 3. The first movement unit 3 is provided in a center pad 8 disposed in an approximate center of the handle 2. The first movement unit 3 allows the first left division 51 and the first right division 52 of the first division 5 to turn in opposite directions. That is, the first left movement section 31 allows the first left division 51 to turn in the counterclockwise direction, and meanwhile the first right movement section 32 allows the first right division 52 to turn in the clockwise direction. Here, an airbag device, an alarm whistle device, and a steering column are provided in the center pad 8. The steering column extends in the front part of the center pad 8.

The first left division 51 is supported via a left spoke 91 extending from the first left movement section 31, and meanwhile, the first right division 52 is supported by a right spoke 92 extending from the first right movement section 32. By this means, it is possible to transfer the driving force generated in the first movement unit 3 to the first left division 51 and the first right division 52 by the left spoke 91 and the right spoke 92.

The turning shaft 33 is a shaft member disposed in the center pad 8, which can turn by the driving force transferred from the first movement unit 3. The left spoke 91 and the right spoke 92 are configured to couple the turning shaft 33 to the first left division 51 and the first right division 52. The driving force transferred from the turning shaft 33 allows the left spoke 91 and the right spoke 92 to turn with respect to the axis of the turning shaft 33. With the present example, the turning directions of the first left division 51 and the first right division 52 are symmetric with respect to the centerline of the steering wheel 1 in the width direction, because the driving force is transferred from the first left movement section 31 and the first right movement section 32 to the first left division 51 and the first right division 52 in opposite directions via respective gears. Here, with the present example, the central axis of the turning of the first left division 51 matches that of the first right division 52. However, the central axes may not necessarily match one another, and the central axis of the turning may be different from one another depending on the shape of the handle 2, in particular the shape of the first division 5.

The second movement unit 4 is not limited as long as it allows the second division 6 to move forward and to generate a force to move the second division 6 forward. For example, any actuator may be used as the second movement unit 4. The second movement unit 4 is disposed behind the center pad 8 and the handle 2. The second division 6 is supported by a guide 10. By this means, the driving force generated in the second movement unit 4 is transferred to the second division 6 by the guide 10.

As illustrated in FIG. 2B, the guide 10 includes a base 101, a rail 102, a slider 103, a driving shaft 104, and a link 105. The base 101 extends in the vertical direction. One end of the base 101 is fixedly provided in the center pad 8, and the other end of the base 101 protrudes downward from the center pad 8. The rail 102 is a rail-shaped member which is disposed on the other end of the base 101, and extends in the front-to-back direction. The slider 103 is provided to engage with the rail 102, and can slide forward and backward along the rail 102. As the rail 102 and the slider 103, for example, a linear guide that allows smooth linear-motion may be used. In the initial state illustrated in FIG. 2B, that is, in a state where the first movement unit 3 and the second movement unit 4 are not driven to move the first division 5 and the second division 6, and therefore it is possible to perform normal manual driving, the slider 103 is disposed at the rear end of the rail 102. The second division 6 of the handle 2 is fixedly supported by the rear part of the slider 103. By this means, when the slider 103 moves forward with respect to the rail 102, the second division 6 supported by the slider 103 slides forward. The driving shaft 104 is a shaft member which is disposed in the vicinity of the base 101 and can turn by the driving force transferred from the second movement unit 4. The link 105 is configured to couple the slider 103 to the driving shaft 104, and can turn forward and backward with respect to the axis of the driving shaft 104 by the driving force transferred from the driving shaft 104.

The controller 7 can output driving signals to the first movement unit 3 and the second movement unit 4. The controller 7 is not limited as long as it can control the drive of the first movement unit 3 and the second movement unit 4. For example, an ECU which is an in-vehicle processing unit may be used as the controller 7.

It is preferred to separate the first division 5 and the second division 6 to deform the shape of the steering wheel 1 according to the present example, when the vehicle is driven under the automated driving control. The controller 7 can determine whether the first movement unit 3 and the second movement unit 4 are driven, based on the control state of a driving controller 11 which controls the steering and the acceleration and deceleration for the automated driving control of the vehicle. The driving controller 11 can output signals indicating the control state of the vehicle to the controller 7. Here, the automated driving control includes completely-automated driving control by the vehicle, and advanced driving support control that the major part of the driving of the vehicle is passed from the driver to the vehicle side.

Figure 3A:
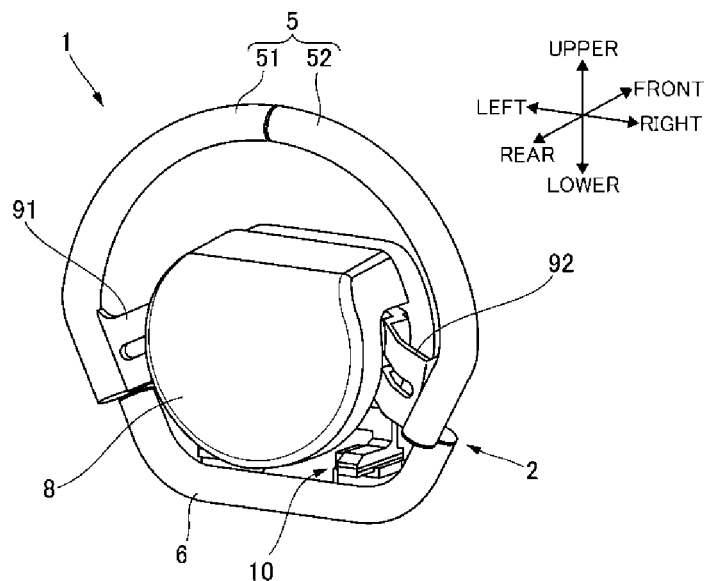
FIG. 3A is a perspective view schematically illustrating the steering wheel when a second movement unit illustrated in FIG. 1 is driven.
Figure 3B:
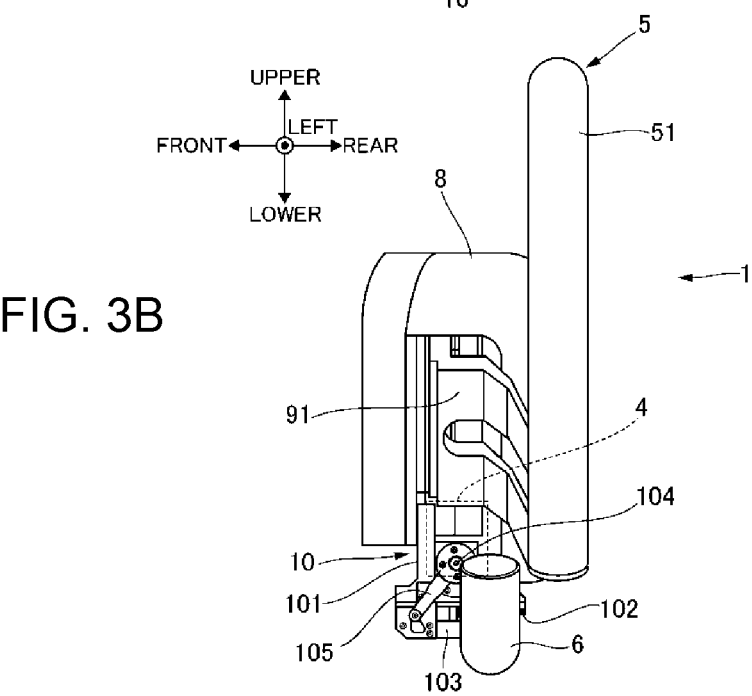
FIG. 3B is a side view schematically illustrating the steering wheel when the second movement unit is driven.
Figure 4A:
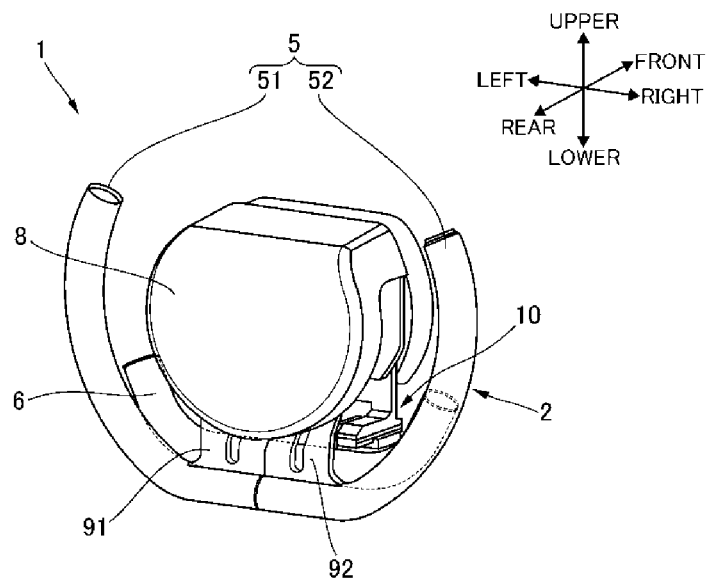
FIG. 4A is a perspective view schematically illustrating the steering wheel when a first movement unit illustrated in FIG. 1 is driven.
Figure 4B:
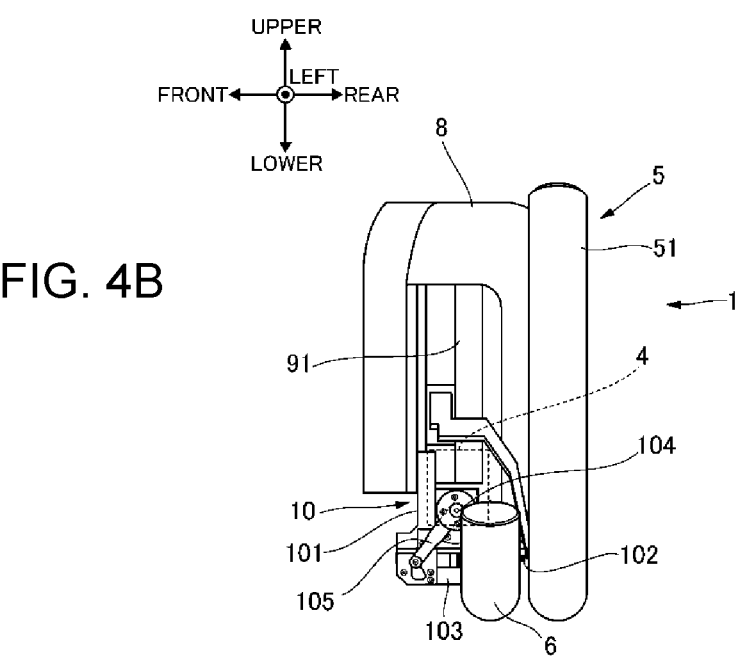
FIG. 4B is a side view schematically illustrating the steering wheel when the first movement unit is driven.

Next, the deformation of the steering wheel 1 according to the present example will be described with reference to FIGS. 3 and 4. FIG. 3A is a perspective view schematically illustrating the steering wheel 1 when the second movement unit 4 illustrated in FIG. 1 is driven. FIG. 3B is a side view schematically illustrating the steering wheel 1 when the second movement unit is driven. In addition, FIG. 4A is a perspective view schematically illustrating the steering wheel 1 when the first movement unit 3 illustrated in FIG. 1 is driven. FIG. 4B is a side view schematically illustrating the steering wheel 1 when the first movement unit 3 is driven.

First, the controller 7 receives a signal indicating that the driving controller 11 illustrated in FIG. 1 performs the automated driving control. During the automated driving control of the vehicle, the controller 7 outputs a driving signal to the second movement unit 4. By this means, the second movement 4 is driven to move the second division 6 forward as illustrated in FIG. 3.

When the second movement unit 4 is driven, the torque is transferred to the driving shaft 104. When the driving shaft 104 is rotated, one end of the link 105 coupled to the driving shaft 104 turns forward with respect to the axis of the driving shaft 104. When the one end of the link 105 turns forward, the slider 103 coupled to the one end of the link 105 slides forward along the rail 102. When the slider 103 moves forward, the second division 6 coupled to the rear part of the slider 103 moves forward. At this time, the ends of the second division 6 fixedly coupled to the ends of the first division 5 are decoupled to separate the first division 5 and the second division 6 into up and down. The amount of driving of the second movement unit 4, that is, the amount of forward movement of the second division 6 is not limited as long as it hinders the movement of the first division 5, and can be set as a movement distance for which at least the first division 5 cannot be placed on the second division 6.

After the first division 5 is separated from the second division 6, and the second division 6 has been moved, the controller 7 outputs a driving signal to the first movement unit 3. By this means, as illustrated in FIG. 4, the first movement unit 3 is driven to move the first division 5.

When the first left movement section 31 and the first right movement section 32 of the first movement unit 3 are driven, the torque is transferred to the turning shaft 33. The torque transferred to the turning shaft 33 is transferred to the left spoke 91 and the right spoke 92 coupled to the turning shaft 33 in opposite directions. The first left division 51 turns counterclockwise by the driving force transferred from the first left movement section 31. Meanwhile, the first right division 52 turns clockwise by the driving force transferred from the first right movement section 32. At this time, the first left division 51 and the first right division 52 fixedly coupled to one another in the upper part of the handle 2 are decoupled to separate the first left division 51 and the first right division 52 into right and left in the width direction of the vehicle.

The second division 6 is moved forward by the second movement unit 4 in advance, and therefore, after the first left division 51 and the first right division 52 are separated, the first division 5 can be moved down by the first movement unit 3 to the region in which the second division 6 was initially disposed, that is, the region in which the second division 6 before being moved forward was disposed. When the lower end of the first left division 51 contacts the lower end of the first right division 52, the turning of the first left division 51 and the first right division 62 is completed. In this state, the left spoke 91 and the right spoke 92 are fixed, so that it is possible to fix the first division 5 which has been moved down.

In this way, after the first division 5 and the second division 6 have been moved, the region in which the first division 5 was initially disposed is vacant. That is, there is nothing that blocks the driver's view above the center pad 8.

During the automated driving control, the driver needs to know the running condition of the vehicle in preparation for when the initiative of the driving is passed from the vehicle side to the driver in an emergency. Here, if the driver who is not driving the vehicle tries to monitor the running environment of the vehicle via a front window, a door mirror, and a rearview mirror, the driver is likely to monitor a direction which does not rerates to a driving scenario created by the vehicle side. This makes it difficult to smoothly switch the initiative of the driving in an emergency. Therefore, although the velocity of the vehicle and so forth are mainly indicated on the display panel (meter panel) disposed in front of the driver during the manual driving, there is an increased need to indicate information during the automated driving control or the advanced driving support control, which is different from the information during the manual driving. Therefore, the occupant will be able to understand the driving scenario by the vehicle side via the display panel.

An amount or content of information to be indicated such as the driving scenario during the automated driving control or the advanced driving support control is greater than during the manual driving. If the handle 2 is not divided, that is, if the vehicle is equipped with a conventional steering wheel, the driving scenario for the automated driving or the advanced driving support needs to prevent from being hidden by the steering wheel. Accordingly, it may be difficult for the display panel of a conventional vehicle to have a sufficient display area for the driving scenario, and therefore is necessary to increase the size of the display panel. However, if the size of the display panel is increased for the automated driving control or the advanced driving support control, the field of view with direct vision of the driver is narrowed when the driver watches ahead during the manual driving.

As described above, the steering wheel 1 according to the present example can secure a good field of view of the occupant to view the display panel, because the region in which the first division 5 was initially disposed is vacant. Accordingly, the field of view is not blocked by the handle 2, and therefore it is possible to increase the amount of information and options for the information contents which can be indicated on the display panel. Moreover, when the amount of information and the information contents that can be indicated on the display panel are increased, there is no need to increase the size of the display panel. By this means, it is possible to prevent the field of view with direct vision of the driver from narrowing during the manual driving.

Normally, during the manual driving, the driver mostly holds the upper part of the handle 2 which has not been separated, in particular, a part above the center pad 8 if the vehicle goes straight ahead. Meanwhile, during the automated driving control or the advanced driving support control of the vehicle, the hands of the driver are placed near the handle 2 in preparation for when the initiative of the driving is switched to the driver. In this case, the driver is less likely to hold the upper part of the handle 2 because preventing the arms from getting tired, and may often hold the lower part of the handle 2. The steering wheel 1 according to the present example can solve the problem with the steering during the manual driving, because the handle 2 is not divided and is maintained as a single piece during the manual driving. Moreover, during the automated driving control or the advanced driving support control, the first division 5 separated from the second division 6 is moved down so as to allow the occupant to instantaneously hold the first division 5 in an emergency.

As described above, in the steering wheel 1 according to the present example, the second division 6 is moved forward and the first division 5 is moved to the region in which the second division 6 was initially disposed, and therefore it is possible to make the region in which the first division 5 was initially disposed vacant. For example, when the first division 5 disposed in the upper part of the handle 2 is separated from the second division 6 and moved, the upper part becomes vacant, and therefore it is possible to secure the field of view of the occupant to view the display panel. By securing the field of view to view the display panel, it is possible to indicate an increased amount of information, and consequently there is no need to widen the display panel. As a result, it is possible to provide the steering wheel 1 capable of securing a field of view to view the display panel indicating an increased amount of information during the automated driving, while securing the field of view with direct vision of the driver during the manual driving.

With the above-described example, the second division 6 is moved forward by using the rail 102 and the slider 103. However, the movement of the second division 6 is not limited as long as the second division 6 can be separated from the first division 5, and does not hinder the movement of the first division 5. For example, the second division 6 may turn up with respect to the axis along the width direction of the vehicle to move the lower end of the second division 6 forward.

With the above-described example, the handle 2 is divided into three sections, the first left division 51, the first right division 52, and the second division 6. However, this is by no means limiting, and the handle 2 may be divided into two sections as long as the handle 2 can be separated. For example, the handle 2 may be divided into two sections, the second division 6 which is the same as in the above-described example, and the first division 5 which is not divided into the above-described sections. In this case, after the second division 6 is moved forward by the second movement unit 4, the first division 5 disposed above the second division 6 is turned 180 degrees. By this means, the region in which the first division 5 was initially disposed can become vacant in the same way as FIG. 4, even though the handle 2 is divided into two sections.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A steering wheel comprising:
   a handle configured to be held by an occupant and operated by the occupant to steer a vehicle, the handle being divided into at least a first division and a second division;
   a first movement unit configured to allow the first division to move; and
   a second movement unit configured to allow the second division to move forward,
   wherein after the first division is separated from the second division, the second movement unit moves the second division forward, and the first movement unit moves the first division to a region in which the second division was initially disposed,
   wherein the handle defines a plane,
   wherein:
   the first division is separable into a first side and a second side in a width direction of the vehicle;
   the first movement unit allows the first side and the second side to turn in opposite directions;
   after the first division is separated, the first movement unit turns the first side to the region in which the second division was initially disposed, and turns the second side to the region in which the second division was initially disposed, wherein the first side contacts the second side at the region in which the second division was initially disposed.

2. The steering wheel according to claim 1, wherein when the vehicle goes straight forward before the first division is separated from the second division, the first division is positioned above the second division.

3. The steering wheel according to claim 2, further comprising a controller configured to control drive of the first movement unit and drive of the second movement unit, wherein the controller controls the first movement unit and the second movement unit during automated driving control of the vehicle.

4. The steering wheel according to claim 3, wherein the second division moves forward by sliding forward or turning with respect to an axis along the width direction of the vehicle.

5. The steering wheel according to claim 2, wherein the second division moves forward by sliding forward or turning with respect to an axis along the width direction of the vehicle.

6. The steering wheel according to claim 1, further comprising a controller configured to control drive of the first movement unit and drive of the second movement unit, wherein the controller controls the first movement unit and the second movement unit during automated driving control of the vehicle.

7. The steering wheel according to claim 6, wherein the second division moves forward by sliding forward or turning with respect to an axis along the width direction of the vehicle.

8. The steering wheel according to claim 1, wherein the second division moves forward by sliding forward or turning with respect to an axis along the width direction of the vehicle.

* * * * *